United States Patent
Conroy et al.

(10) Patent No.: US 11,587,444 B2
(45) Date of Patent: Feb. 21, 2023

(54) AUTONOMOUS VEHICLE PARKING AND SERVICING USING TERMINALS

(71) Applicant: FORD GLOBAL TECHNOLOGIES, LLC, Dearborn, MI (US)

(72) Inventors: Donald Christopher Conroy, Novi, MI (US); Fiona Jane Gronowicz, Plymouth, MI (US); Jay Davis, Bloomfield, MI (US); John David Jorgensen, Carleton, MI (US); Satyavardhan Naga Injeti, Farmington Hills, MI (US); Peter J. Nikolajevs, Dearborn, MI (US); Ronald T. Oppat, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 623 days.

(21) Appl. No.: 16/180,844

(22) Filed: Nov. 5, 2018

(65) Prior Publication Data

US 2020/0143686 A1    May 7, 2020

(51) Int. Cl.

| | |
|---|---|
| *G06Q 50/30* | (2012.01) |
| *G08G 1/00* | (2006.01) |
| *G05D 1/00* | (2006.01) |
| *G08G 1/14* | (2006.01) |
| *B60R 25/20* | (2013.01) |
| *G05D 1/02* | (2020.01) |

(52) U.S. Cl.
CPC ........... *G08G 1/20* (2013.01); *B60R 25/2018* (2013.01); *G05D 1/0088* (2013.01); *G05D 1/0291* (2013.01); *G06Q 50/30* (2013.01); *G08G 1/14* (2013.01); *G05D 2201/0213* (2013.01); *G06Q 2240/00* (2013.01)

(58) Field of Classification Search
None
See application file for complete search history.

(56) References Cited

U.S. PATENT DOCUMENTS

| | | | |
|---|---|---|---|
| 10,042,359 B1* | 8/2018 | Konrardy | G05B 15/02 |
| 2015/0339928 A1* | 11/2015 | Ramanujam | G06Q 50/30 |
| | | | 701/23 |
| 2017/0278312 A1* | 9/2017 | Minster | G05D 1/0297 |
| 2018/0315146 A1* | 11/2018 | Matthiesen | G01C 21/3453 |
| 2019/0051061 A1* | 2/2019 | Battles | G07C 5/08 |
| 2019/0205842 A1* | 7/2019 | Starns | B60L 53/65 |
| 2020/0294401 A1* | 9/2020 | Kerecsen | G05D 1/0287 |
| 2021/0056483 A1* | 2/2021 | Kajiwara | H04W 4/023 |
| 2021/0081908 A1* | 3/2021 | Derouen | G05D 1/0297 |
| 2022/0246034 A1* | 8/2022 | Humphreys | G08G 1/144 |

* cited by examiner

*Primary Examiner* — James M McPherson
(74) *Attorney, Agent, or Firm* — Brandon L. Hicks; Brooks Kushman P.C.

(57) ABSTRACT

A scheduling server is programmed to register terminals for autonomous vehicle use by allocating both capabilities and available times of the terminals to the server; identify a service to perform to an autonomous vehicle using data received from the vehicle; and send a waypoint to the vehicle directing the vehicle to arrive at an identified one of the terminals having capability to perform the service during the available times of the identified terminal.

19 Claims, 4 Drawing Sheets

AUTONOMOUS VEHICLE PARKING AND SERVICING USING TERMINALS

TECHNICAL FIELD

Aspects of the disclosure generally relate to the parking and servicing of autonomous vehicles using terminals during times when the terminals have capacity.

BACKGROUND

Driven vehicles are typically parked close to a destination, where they can be returned to later for the next trip. Instead of parking, autonomous vehicles continue along the roadway to serve other riders. Autonomous vehicles still require refueling and other maintenance services. These services may be performed at service centers or other facilities operated by managers of an autonomous vehicle fleet.

SUMMARY

In one or more illustrative examples, a scheduling server is programmed to register terminals for autonomous vehicle use by allocating both capabilities and available times of the terminals to the server; identify a service to perform to an autonomous vehicle using data received from the vehicle; and send a waypoint to the vehicle directing the vehicle to arrive at an identified one of the terminals having capability to perform the service during the available times of the identified terminal.

In one or more illustrative examples, a method includes identifying, from data received over a wide-area network from an autonomous vehicle, a service for the vehicle and a terminal for performing the service; directing the vehicle to the terminal; providing access to the vehicle responsive to arrival of the vehicle at the terminal; and allowing the vehicle to be used for autonomous driving responsive to confirmation that the service is completed.

In one or more illustrative examples, a non-transitory computer-readable medium includes instructions that, when executed by a scheduling server, cause the server to identify, from data received over a wide-area network from an autonomous vehicle, a first service for the vehicle to be performed at a first terminal and a second service for the vehicle to be performed at a second terminal; direct the vehicle to the first terminal; provide access to the vehicle to the first terminal to perform the first service responsive to arrival of the vehicle at the first terminal; direct the vehicle to the second terminal responsive to confirmation that the first service is completed; provide access to the vehicle to the second terminal to perform the second service responsive to arrival of the vehicle at the second terminal; and allow the vehicle to be used for autonomous driving responsive to confirmation that the second service is completed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Autonomous vehicles provide efficient transportation within urban environments. However, one of the challenges of autonomous vehicles is providing parking and servicing for the vehicles when they are not in use. If autonomous vehicles are parked in the suburbs, then travel of the autonomous vehicles from the city to the suburbs increases roadway congestion. While urban parking facilities are busy during work hours, they may offer significant unused capacity during off-peak hours. For example, a package delivery terminal may have unused capacity during the day. Or, a city parking garage may be mostly empty at night, from 10 PM to 3 AM for instance. This unused capacity results from these locations having a peak capacity that is not always required for operation. Other examples of this unused capacity may include capacity for refueling vehicles, charging vehicles (wired and/or wireless), battery swapping, data transfers (wired and/or wireless), or reclamation of stored energy in vehicle systems back into the electric grid.

Terminal capacity may be allocated to provide for parking and servicing of autonomous vehicles according to vehicle need. This capacity may include unused terminal capacity of existing terminals, as well as new capacity resulting from the creation of additional terminals. The vehicle needs may be resolved through the performance of various services, such as washing, refueling, repair, updating of software, cleaning of spills, or addressing other issues within the vehicle interior. As vehicles may require different services, and as terminals may have different capacities to address those needs, a server may be programmed to identify which vehicles are to be directed to what terminals.

A terminal refers to a facility that may be used to service vehicles. This could include retailers, parking lots/garages, fueling stations, new facilities constructed by fleet owners or operators, etc. The terminals may be configured to provide information regarding the servicing capabilities of the terminals. For instance, the terminals may provide information indicative of what services are available, such as car washes, staff to clean vehicle interiors, battery chargers, or refueling stations. The terminals may further provide information indicative of the quantity of vehicles that can be serviced, the amount of time required to service an individual vehicle, and/or information indicative of when the vehicle may be available for use. In some cases, ready times for the terminals are predictive via artificial intelligent algorithms (AI), where vehicles are placed back into service to optimize uptime and/or vehicle usage.

The vehicles may be configured to provide status information to allow the server to identify vehicle needs. This status information may include, as some examples, fuel level, battery state of charge, distance traveled, oil life estimation, vehicle health, and engine or ambient temperature. This status information may further include information regarding the state of the vehicle cabin or a change in state of the vehicle, such as data from spill sensors configured to determine whether liquid was spilled on a vehicle seat, data from smell sensors configured to determine whether the vehicle cabin has an odor, data from seat sensors indicating weight located on the seats, image data from a camera providing imaging of the vehicle cabin, and/or data from heat and/or smoke sensors to identify potential fire risk. The imaging from the camera, for example, may be used to identify a change in the state of the vehicle. It should be noted that there are only some possibilities, and other situations that relate to the vehicle occupant may be included in the vehicle status as well, such as an illness of a passenger or an unexpected baby delivery. The server may also receive feedback from vehicle occupants indicating a status of the vehicle. As an additional possibility, the vehicle data may include a recording of audible feedback from interior occupants and/or exterior surroundings. As yet a further example, the vehicle data may indicate packages or items that were left behind, packages that were undelivered, and/or packages that were collected by a customer. The vehicle data may also indicate a searing or other cabin configuration of the vehicle based on delivery type (e.g., whether the vehicle cabin is set up for the transport of people, for the transport of packages or other goods, whether the vehicle cabin is set up for the transport of a combination of people and goods, etc.)

By using this information from vehicles and terminals, and by taking advantage of available capacity of the terminals during off-peak or other times during which the terminals have capacity, autonomous vehicles may be efficiently serviced with a minimum of cost and/or dead head miles. Further aspects of the disclosure are described in detail herein.

Figure 1:
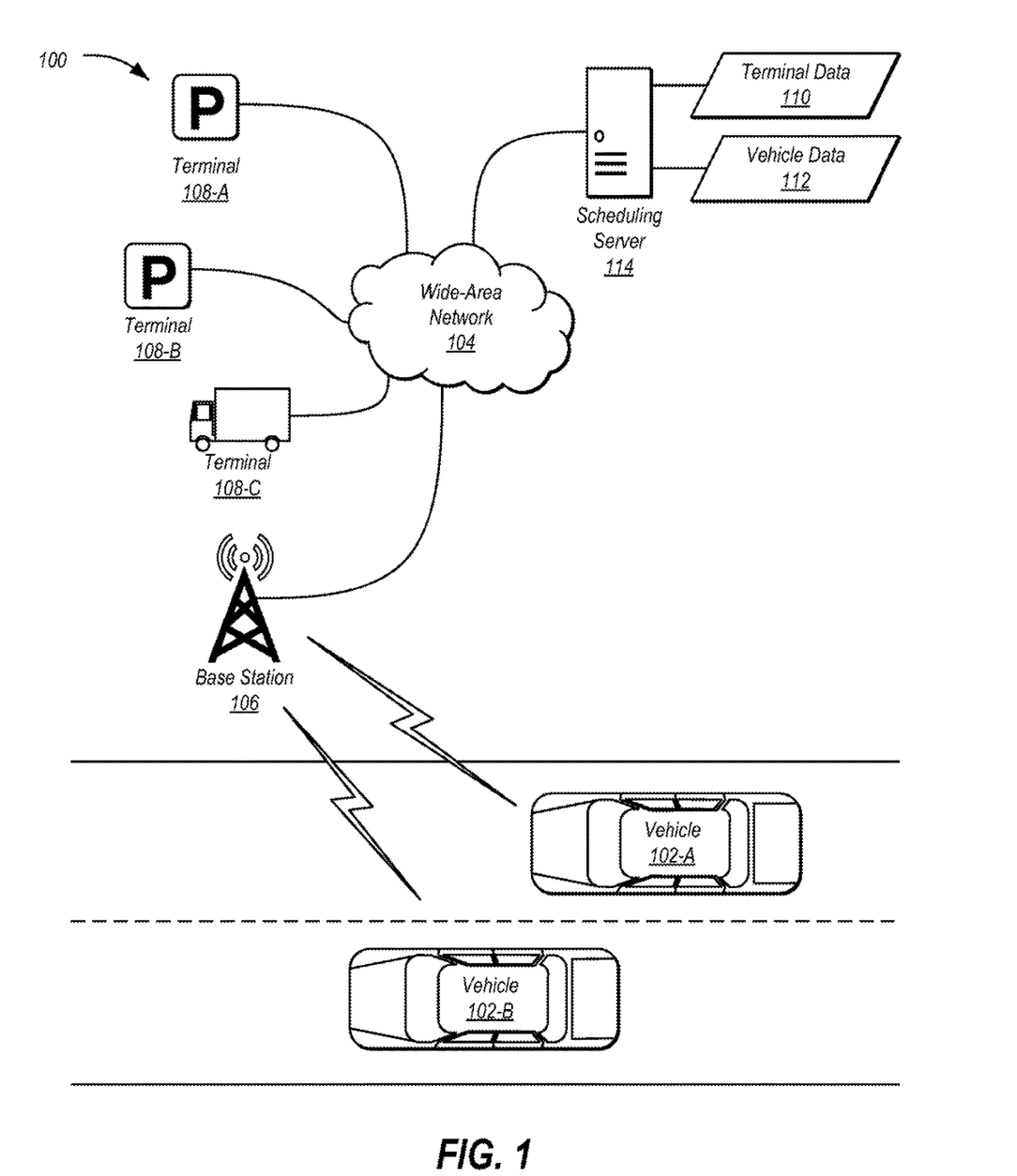
FIG. 1 illustrates an example system for servicing vehicles at terminals.

FIG. 1 illustrates an example system 100 for servicing vehicles 102 at terminals 108-A, 108-B, 108-C (collectively 108). As shown, the system 100 includes vehicles 102-A and 102-B (collectively 102) in communication with a scheduling server 114 over a wide-area network 104. The vehicle 102 is configured to wirelessly communicate with base stations 106 connected to the wide-area network 104. Only one base station 106 is shown for clarity, but it should be noted that systems 100 typically include many base stations 106 arranged to cover a large geographical area. While an example system 100 is shown in FIG. 1, the example components as illustrated are not intended to be limiting. Indeed, the system 100 may have more or fewer components, and additional or alternative components and/or implementations may be used. As an example, the system 100 may include more or fewer vehicles 102, base stations 106, terminals 108, and/or scheduling servers 114. As one non-limiting possibility, a system 100 may include zero base stations 106 with vehicle 102 communication being performed to another network such as to a satellite network.

The vehicles 102 may include various types of automobile, crossover utility vehicle (CUV), sport utility vehicle (SUV), truck, recreational vehicle (RV), boat, plane, drone, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As yet a further possibility, the vehicle 102 may be electrically-driven, without use of an internal combustion engine. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The wide-area network 104 may include one or more interconnected communication networks such as the Internet, a cable television distribution network, a satellite link network, a local area network, and a telephone network, as some non-limiting examples. By accessing the wide-area network 104, the vehicle 102 may be able to send outgoing data from the vehicle 102 to network destinations on the wide-area network 104 and receive incoming data to the vehicle 102 from network destinations on the wide-area network 104.

The base stations 106 may include system hardware configured to allow cellular transceivers of the vehicles 102 to access the communications services of the wide-area network 104. In an example, the base stations 106 may be part of a Global System for Mobile communication (GSM) cellular service provider. In another example, the base stations 106 may be part of a code division multiple access (CDMA) cellular service provider. The base stations 106 may support various different technologies and data speeds. For instance, the base stations 106 may support 3G, 4G LTE, and/or 5G communications technologies. It should be noted that cellular communication is discussed herein as one example, but other wireless technologies may be utilized, such as dedicated short-range communications (DSRC).

The terminals 108 include facilities that may be used to perform services to vehicles 102. As some examples, the terminals 108 may include parking garages, parking lots, delivery vehicle staging areas, retailers, fueling stations, vacant land, or other facilities in which vehicles 102 may be parked, located, or serviced. In an example, a terminal 108 may be a parking structure under the control of a city or other municipality. In another example, a terminal 108 may be owned or operated by an entity in the private-sector, such as a gas station or other retailer, a university, a vehicle manufacturer, or a vehicle dealership. One or more terminals 108 may be existing facilities that have available capacity that can be reallocated to use in servicing vehicles 102. One or more terminals 108 may additionally or alternatively be new facilities, e.g., facilities that are created from a brown-field piece of land for servicing vehicles 102. Terminals 108 may accordingly be publicly owned, privately owned, non-profit, municipal, for profit, etc. In yet a further example, some terminals 108 may be mobile terminals 108, meaning that they may be vehicles 102 that move from location to location, as opposed to parking structures which generally remain at a fixed location. For instance, a refueling truck may serve as a mobile terminal 108 that can meet up with vehicles 102 that require refueling. As another possibility, mobile cleaning and/or washing may be offered by mobile terminals 108. As shown in FIG. 1, the terminals 108-A and 108-B are fixed location terminals 108, while the terminal 108-C is a mobile terminal.

Figure 2:
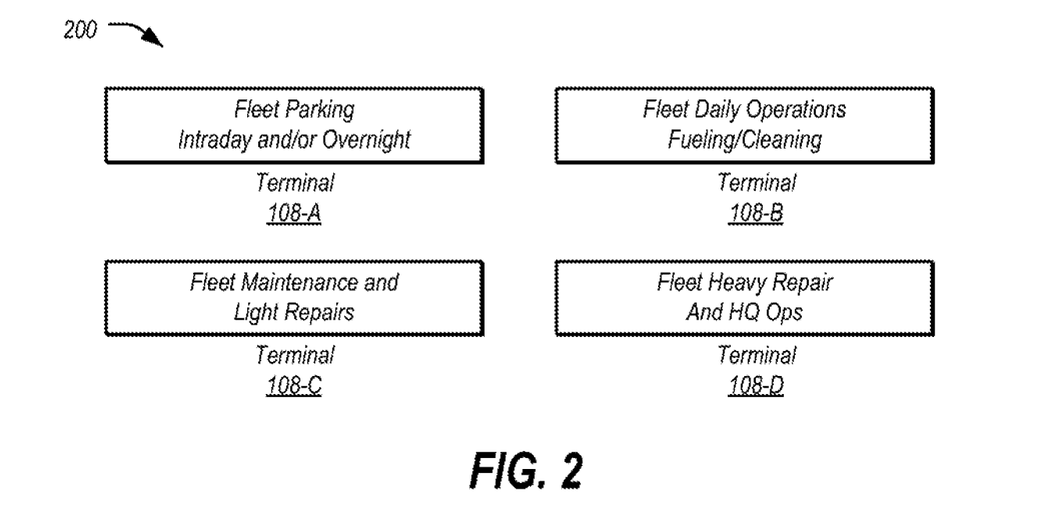
FIG. 2 illustrates an example of a plurality of terminals having different capabilities.

FIG. 2 illustrates an example 200 of a plurality of terminals 108 having different capabilities. As shown, the terminal 108-A may have the capability of fleet parking, including intraday and/or overnight parking. The terminal 108-B may have the capabilities of performing fleet daily operations services, such as routine refueling and cleaning, charging (wired and/or wireless), battery swapping, etc. The terminal 108-C may have the capabilities of performing fleet maintenance and light repairs to vehicles 102. In some examples, the terminals 108-B and 108-C may include mobile terminals 108. For instance, a mobile terminal 108 may be especially useful for performing triage on a vehicle 102 that may be unable to move on its own. One or more of the terminals 108 may include the capability of performance of wired and/or wireless data transfers to and from the vehicle 102. In some cases, vehicles 102 located at terminals 108 may be utilized for reclamation of stored electrical power to be provided into the electrical grid.

The terminal 108-D may have the capabilities of performing fleet heavy repair, as well as headquarters operations functions. For instance, the terminal 108-D may be responsible for preparation of new vehicles 102 to be added to the fleet, as well as for indication that certain vehicles 102 are to be marked for disposal or recycling. As another example, the terminal 108-D may have one or more calibration bays for use in video data sensor or camera calibration for the vehicles 102. The terminal 108-D may additionally or alternately provide for additional services, such as onboarding and provisioning of software, dismantling and parts reclamation (re-use solution for parts & technology, which may include hardware and/or software), repurposing of vehicles 102 or parts of vehicles 102, body repair (e.g., paint, sheet metal, glass etc.), pre-delivery inspection (PDI) including prepping the vehicle 102 for use and/or upfitting the vehicle 102 with special equipment for the fleet, and/or parts stocking and/or warehousing for parts that may be necessary for vehicle 102 maintenance.

Referring back to FIG. 1, terminal data 110 may include information regarding these and other capabilities of the terminal 108 to address vehicle needs. The terminal data 110 may include information indicative of what services are available at the terminal 108, such as vehicle 102 washes, staff to clean vehicle 102 interiors, battery chargers, or refueling stations. The terminal data 110 may also include information indicative of the quantity of vehicles 102 that can be serviced, and/or the amount of time required to service an individual vehicle 102. As another possibility, the terminal data 110 may indicate a quantity of spaces remaining for parking or other services. For mobile terminals 108, the terminal data 110 may further include the current location of the mobile terminal 108 and/or routing information to future locations of the mobile terminal 108. The terminal data 110 may also include additional information, such as data indicative of reconciliation of contractual agreements (e.g., authentication of vehicle 102 entry or exit, status regarding whether a vehicle 102 was processed by a terminal 108, etc.), technology used as the solution to balance payment for any servicing that was performed, etc.

Similarly, vehicle data 112 may include information indicative of the vehicle 102 status. This information may be used to identify vehicle 102 needs. The vehicle data 112 may include, as some examples, vehicle 102 location, fuel level, battery state of charge, distance traveled, oil life estimation, vehicle 102 health, and engine or ambient temperature. This vehicle data 112 may further include information regarding the state of the vehicle 102 cabin, such as data from spill sensors configured to determine whether liquid was spilled on a vehicle 102 seat, data from smell sensors configured to determine whether the vehicle 102 cabin has an odor, data from seat sensors indicating weight located on the seats, image data from a camera within the vehicle 102 cabin, and/or data from heat and/or smoke sensors to identify potential fire risk. The vehicle data 112 may also include feedback from vehicle 102 occupants indicating a status of the vehicle 102. For instance, a vehicle 102 occupant may report an unusual odor that was noticed within the vehicle 102. As an additional possibility, the vehicle data 112 may include a recording of audible feedback from interior occupants and/or exterior surroundings. As yet a further example, the vehicle data 112 may indicate packages or items that were left behind, packages that were undelivered, and/or packages that were collected by a customer. The vehicle data 112 may also indicate a seating or other cabin configuration of the vehicle 102 based on delivery type (e.g., whether the vehicle 102 cabin is set up for the transport of people, for the transport of packages or other goods, whether the vehicle 102 cabin is set up for the transport of a combination of people and goods, etc.)

The scheduling server 114 may include various types of computing apparatus in support of performance of the functions of the scheduling server 114 described herein. In an example, the scheduling server 114 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc. Computational techniques, such as artificial intelligence and cloud computing, HTML and other web technologies, blockchain and quantum computing may be utilized as well. Generally, the scheduling server 114 be programmed to provide service maintenance and parking management services to the vehicles 102 based on received information.

Figure 3:
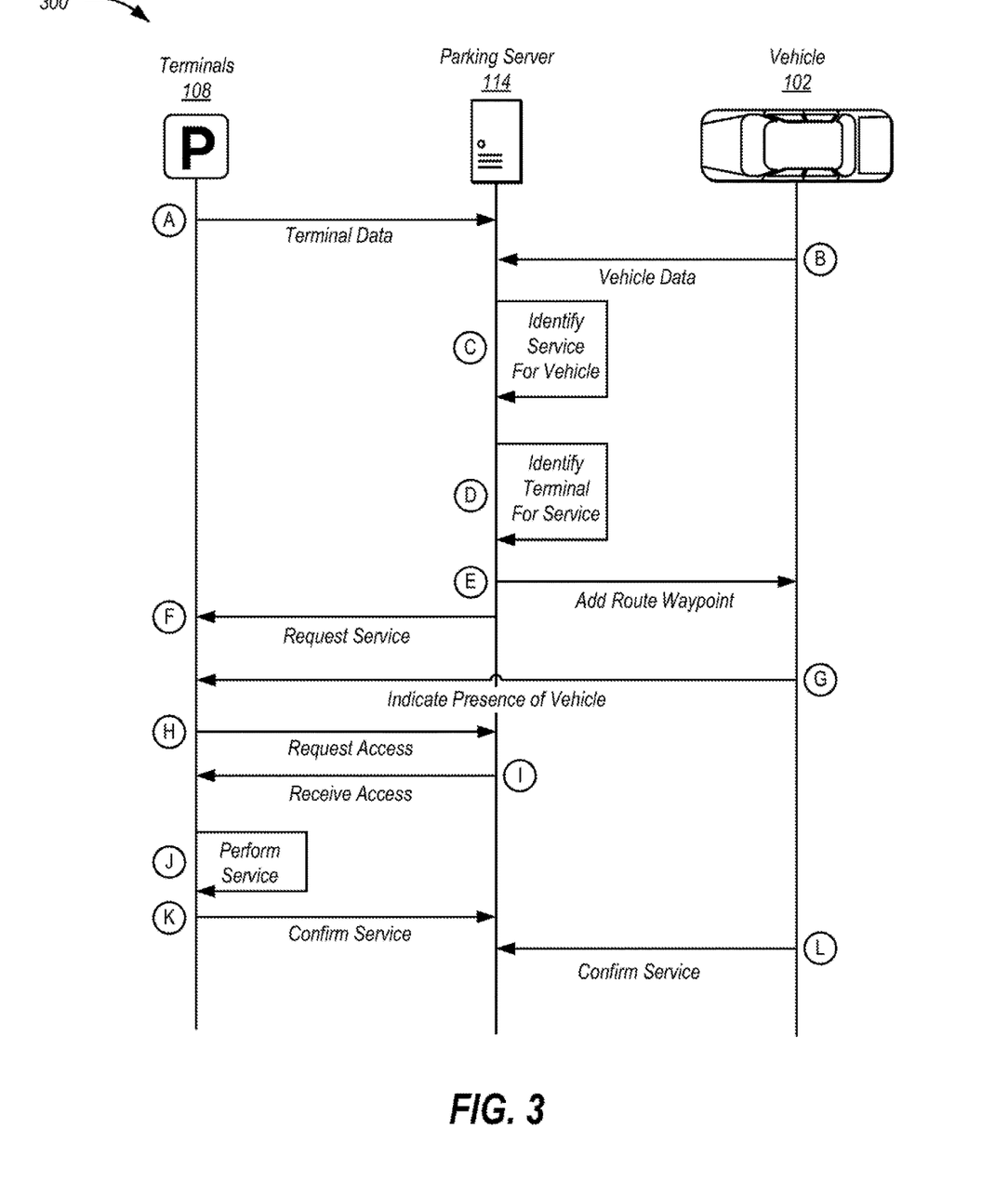
FIG. 3 illustrates an example data flow for the operation of the parking server in directing vehicles to parking facilities.

FIG. 3 illustrates an example data flow 300 for the operation of the scheduling server 114 in directing vehicles 102 to terminals 108. It should be noted that the scenario illustrated in the data flow 300 is but one example, and more, fewer, different, or differently-ordered operations may be utilized a well.

The illustrated data flow 300 begins at index (A), wherein one or more of the terminals 108 sends terminal data 110 to the scheduling server 114 over the wide-area network 104. Similarly, at index (B), one or more of the vehicles 102 sends vehicle data 112 to the scheduling server 114 over the wide-area network 104. It should be noted that these operations at indexes (A) and (B) may be performed periodically, continuously, randomly, or based on various trigger conditions.

For instance, terminals 108 may report terminal data 110 hourly, daily, or monthly. In another example, terminals 108 may report terminal data 110 responsive to changes in schedule or capabilities of the terminals 108. In yet another example, terminals 108 may report terminal data 110 responsive to a facility being full, responsive to completion of service of a single vehicle 102 or predefined number of vehicles 102, or responsive to manual operator input.

Similarly, vehicles 102 may report vehicle data 112 responsive to occurrence of various trigger conditions. These conditions may include, as some examples, the vehicle traversing a predefined distance, after a predefined amount of time of operation, after a predefined amount of time has elapsed, after a predefined number of key-on cycles, or responsive to a change in vehicle 102 status or condition. A change in vehicle 102 status or condition may be identified based on sensors of the vehicle 102, and/or based on input received to the vehicle 102 from an operator or from the rider of the vehicle 102.

Based on the information from the vehicles 102 and the terminals 108, the scheduling server 114 may be programmed to match the vehicles 102 to the terminals 108 for servicing according to vehicle 102 location, what service is required for the vehicle 102 based on the vehicle data 112, and what terminals 108 have capacity to perform the required service based on the terminal data 110. In an example, at index (C) the scheduling server 114 identifies one or more services that are required to be performed to the vehicle 102. For instance, if the vehicle data 112 indicates that the vehicle 102 is low on fuel, then the scheduling server 114 may indicate that refueling service is required. Or, if the vehicle data 112 indicates that the vehicle 102 has a spill within the vehicle 102 cabin, the scheduling server 114 may indicate that a cabin cleanup service is required.

At index (D) the scheduling server 114 identifies one or more terminals 108 to perform the indicated one or more services. In an example, the scheduling server 114 may utilize the terminal data 110 to identify terminals 108 with the capability and capacity to perform the indicated one or more services. For instance, if a refueling or charging service is indicated, then the scheduling server 114 may identify a terminal 108 that both provides for refueling or charging, and that has available space to refuel or charge the vehicle 102. In another example, if a parking service is indicated, then the then the scheduling server 114 may identify a terminal 108 that provides for parking, and that has available space to parking the vehicle 102. In some examples, the scheduling server 114 may maintain count information of available slots for servicing vehicles 102 and may decrement the count of available slots for servicing vehicles 102 for the terminal 108 responsive to directing a vehicle 102 to the terminal 108.

In some cases, multiple services are required that can be performed at a single terminal 108. In other cases, the services may not all be available at a single terminal 108, and the vehicle 102 may be required to travel to multiple terminals 108 to receive the indicated services. For instance, the vehicle 102 may require refueling service at one terminal 108 and a specialized cleaning service available at another terminal 108.

The scheduling server 114 may further utilize vehicle location information to determine one or more terminals 108 in a location suitable for servicing the vehicle 102. In an example, the scheduling server 114 may utilize current vehicle 102 location information from the vehicle data 112 to identify terminals 108 of those identified at index (C) that are close to the vehicle 102 (which may include terminals 108 having a fixed location and/or mobile terminals 108). In another example, the scheduling server 114 may utilize expected future vehicle 102 location information as identified from a route that the vehicle 102 is intended to traverse to identify terminals 108 of those identified at index (C) that will be close to the vehicle 102.

At index (E), the scheduling server 114 sends one or more route waypoints to the vehicle 102 specifying the indicated one or more terminals 108. In an example, a waypoint may indicate a location of a fixed terminal 108. In another example, a waypoint may indicate a rendezvous location of the vehicle 102 to a mobile terminal 108. In yet another example, a waypoint may indicate that the vehicle 102 remains at its current location and the mobile terminal 108 will meet up with the vehicle 102, without the vehicle 102 having to move.

At index (F), the scheduling server 114 informs the terminal(s) 108 of the request for servicing of the vehicle 102. At index (G), responsive to receipt of the waypoint from the scheduling server 114, the vehicle 102 routes to one of the specified terminals 108 for service (and/or the mobile terminal 108 routes to the vehicle 102 location or a rendezvous location). Responsive to arriving at the specified location of the terminal 108 (and/or the mobile terminal 108 arriving at the specific location of the vehicle 102), the vehicle 102 indicates presence of the vehicle 102 to the terminal 108. This may be done, e.g., via direct short-range communication from the vehicle 102 to the terminal 108 such as via BLUETOOTH, WI-FI, or DSRC. Or, this communication may be performed via the wide-area network 104, with or without use of the scheduling server 114 as an intermediary.

Once arrived, the scheduling server 114 may be configured to facilitate access by the terminal 108 to the vehicle 102 responsive to the vehicle 102 arriving at or being at the terminal 108 for service.

In an example, at index (H) the scheduling server 114 receives an access request for the vehicle 102 from the terminal 108. Responsive to receipt of the request, at index (I) the scheduling server 114 sends a door unlock command to the vehicle 102 to allow for access to the vehicle 102 interior. In another example, the scheduling server 114 may provide access credentials, such as a key or passcode, to the terminal 108 that may be provided via the terminal 108 to the vehicle 102 to allow for access. These access request functionalities may be performed using various technologies, such as phone as a key (PaaK) functionality where an authorized mobile device may be used to unlock the vehicle, or manual remote control functionality.

The vehicle is serviced at index (J). For instance, the vehicle 102 may be refueled, or the vehicle 102 cabin may be cleaned. Responsive to completion of the service, at index (K) the terminal 108 informs the scheduling server 114 that the service is done. Additionally or alternately, the vehicle 102 may inform the scheduling server 114 at index (L) that service is done. For instance, the vehicle 102 may confirm to the scheduling server 114, using sensors of the vehicle 102, that the fuel level has been increased, or that an odor or wet condition within the vehicle 102 cabin is no longer present. In some examples, this information indicating that service has been completed may include an indication of fulfillment of a work order, as well as a completion time which may be utilized in comparison with a promise time for the fulfillment of the service as indicated in the work order.

As noted above, in some instances a vehicle 102 may require services that cannot be performed at a single terminal 108. Ins such an instance, upon completion of servicing at one terminal 108, the vehicle 102 may proceed to additional services at another terminal 108. If further vehicle 102 servicing is required, the operations (G) through (L) may be repeated for each additional terminal 108 waypoint.

Responsive to confirmation that all requires servicing has been performed, the vehicle 102 may again be used for autonomous driving or other vehicle 102 tasks. Additionally, in examples where the scheduling server 114 maintains count information of available slots for servicing vehicles, the scheduling server 114 may increment the count of available slots for servicing vehicles 102 for the terminal 108 responsive to the confirmation that the service is completed.

Figure 4:
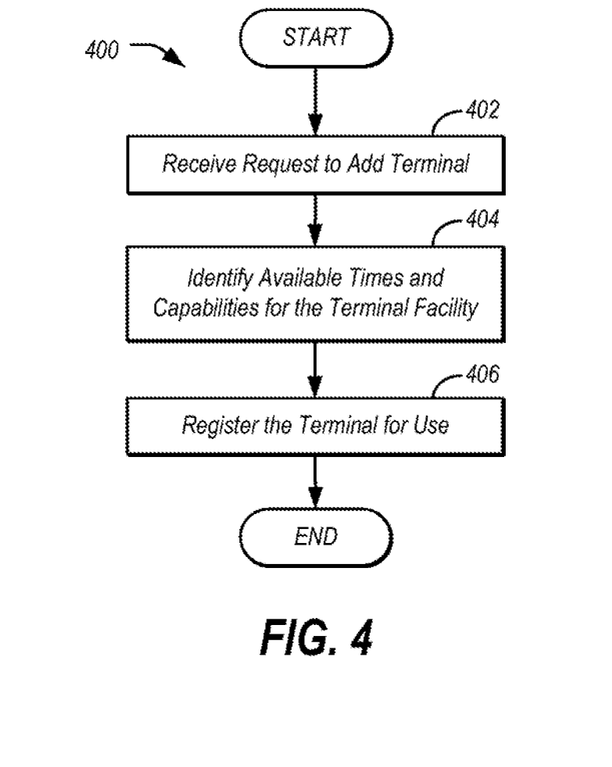
FIG. 4 illustrates an example process for registration of parking facilities with the parking server.

FIG. 4 illustrates an example process 400 for registration of terminals 108 with the scheduling server 114. In an example, the process 400 may be performed by the scheduling server 114 in the context of the system 100 discussed in detail above.

At operation 402, the scheduling server 114 receives a request to add a terminal 108 to the system 100 for use in servicing the vehicles 102. In an example, a contractual agreement may have been established between an owner or operator of a fleet of autonomous vehicles and the terminal 108. In some examples, the terminal 108 may be managed by a city or other municipality. In another example, the terminal 108 may be a newly-created facility created for the purpose of servicing vehicles 102. The scheduling server 114 may be informed of the new option responsive to establishment of the agreement.

At 404, the scheduling server 114 identifies times and capabilities for which the terminal 108 has available capacity. These available times may indicate the times that terminal 108 is available for the servicing of vehicles 102. Notably, these hours may differ from the regular hours of operation of the terminal 108 for handling non-autonomous vehicle traffic. However, the times for which the terminal 108 has available capacity may have overlap with the regular hours of operation of the terminal 108. The capabilities may include indications of the services that are available for use in processing the vehicles 102. The capabilities may further indicate a count of vehicles 102 that may be serviced at the terminal 108. This count may be a total count of vehicles 102 regardless of the service to be performed. Additionally or alternately, this count may be a count for each service that can be provided by the terminal 108. Yet further, the terminal 108 may have a maximum amount of vehicles 102 that may be serviced per day or other time period, and this information may be provided as well.

To identify this information, the request received at operation 402 may itself include the times and capabilities information. In another example, the scheduling server 114 may prompt for the off-peak hours and capabilities information. In yet another example, the scheduling server 114 may query a computing device of the terminal 108 to obtain the information.

The scheduling server 114 registers the terminal 108 for use at operation 406. In an example, the scheduling server 114 adds the terminal 108 information identified at operation 404 to storage of the scheduling server 114. Once added, the scheduling server 114 may utilize the terminal 108 as an option for servicing autonomous vehicles. After operation 406, the process 400 ends.

Figure 5:
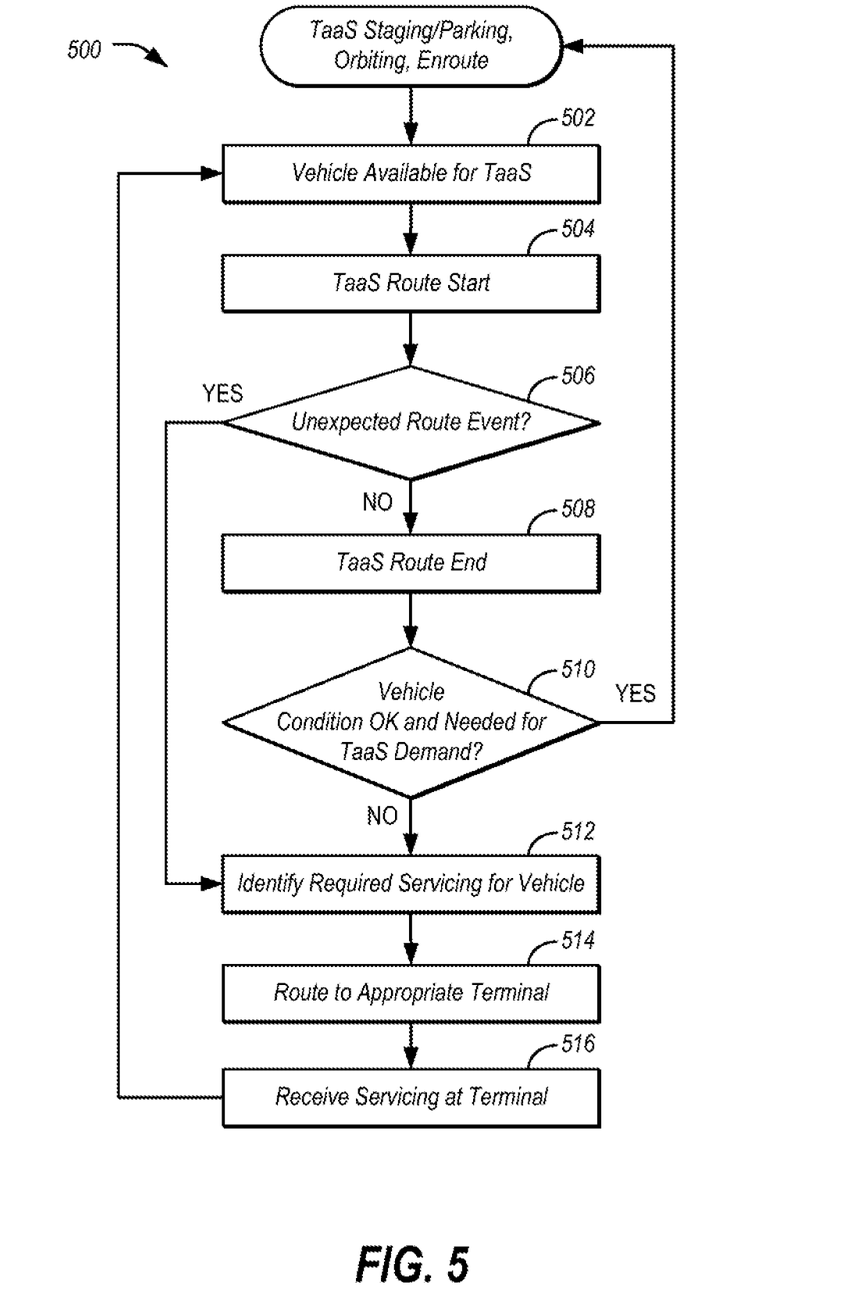
FIG. 5 illustrates an example process for managing a vehicle providing transportation-as-a-service.

FIG. 5 illustrates an example process 500 for managing a vehicle 102 providing transportation-as-a-service (TaaS). The process 500 for a vehicle 102 begins with a vehicle 102 of the fleet that is staged, parked, orbiting or en-route to or within the TaaS area. This vehicle 102 may indicate at 502 as being available for TaaS. In an example, the vehicle 102 may send a message to the scheduling server 114 reflecting the availability of the vehicle 102.

At operation 504, the vehicle 102 starts a route. In an example, the vehicle 102 may receive a route from the scheduling server 114 including one or more waypoints for the vehicle 102 to visit. For instance, the scheduling server 114 may send a message to the vehicle 102 including a pick-up location for a rider and a drop-off location for the rider. Responsive to receipt of the one or more waypoints, the vehicle 102 begins the route.

At 506, the vehicle 102 determines whether an unexpected event has occurred during the route. In an example, the vehicle 102 sensors may indicate there was a spill within the vehicle 102 cabin. In another example, the vehicle 102 controllers may identify diagnostic codes that indicate a vehicle 102 subsystem has failed or needs repair. If such an event has occurred, the route may not be completable, and control passes to operation 512. If not, the vehicle 102 completes the route to the indicated waypoint as indicated at 508.

At operation 510, the vehicle 102 determines whether the vehicle 102 condition is acceptable for continued use in TaaS, as well as whether the vehicle 102 is requires for TaaS. In an example, the vehicle 102 may send vehicle data 112 indicating its operational status as well as data indicating its routing status as having completed the route to the scheduling server 114. Based on the information, the scheduling server 114 may direct the vehicle 102 to stage, orbit, or park. Or, if the vehicle 102 is not in condition or is no longer required, control passes to operation 512.

At 512, the scheduling server 114 identifies the required servicing needs of the vehicle 102 based on the vehicle data 112. At 514, the vehicle 102 routes to the appropriate terminal 108. In an example, the vehicle 102 receives, from the scheduling server 114, a waypoint location of a terminal 108 to be routed to by the vehicle 102. The vehicle 102 accordingly routes to the terminal 108. In another example, a mobile terminal 108 route to the vehicle 102 location. In yet a further example, the vehicle 102 and the mobile terminal 108 each route to a rendezvous location. At 516, the vehicle 102 receives servicing at the terminal 108. Further aspects of these operations are described in detail with respect to the data flow 300. Responsive to completion of the servicing, control returns to operation 502.

In general, computing systems and/or devices, such as those included in the vehicles 102, terminals 108, and scheduling server 114, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as those included in the vehicles 102, terminals 108, and scheduling server 114, generally include computer-executable instructions that may be executable by one or more processors of the computing devices. Computer-executable instructions may be compiled or interpreted from computer programs created using a variety of programming languages and/or technologies, including, without limitation, and either alone or in combination, JAVA™, C, C++, VISUAL BASIC, JAVA SCRIPT, PERL, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Some or all of the operations disclosed herein as being performed may be such computer program products. In some examples, these computer program products may be provided as software that when executed by one or more processors provides the operations described herein. Alternatively, the computer program products may be provided as hardware or firmware, or combinations of software, hardware, and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a scheduling server programmed to
        register terminals for autonomous vehicle use by allocating both capabilities and available times of the terminals to the scheduling server, the terminals including parking garages, wherein the terminals have available capacity for non-autonomous vehicles reallocated to be used in servicing autonomous vehicles, wherein the available times indicate when the terminals are available for servicing the autonomous vehicles, wherein the available times for servicing the autonomous vehicles differ from hours of operation of the terminals for handling non-autonomous vehicle traffic;
        identify a service to perform to an autonomous vehicle using data received from the vehicle; and
        send a waypoint to the vehicle directing the vehicle to arrive at an identified one of the terminals having capability to perform the service during the available times of the identified terminal.

2. The system of claim 1, wherein the terminals include mobile terminals, and the scheduling server is further programmed to send a second waypoint to the identified terminal directing the identified terminal to arrive at an identified rendezvous location for meeting the vehicle.

3. The system of claim 2, wherein the waypoint and the second waypoint each specify a future location of the vehicle.

4. The system of claim 1, further comprising receiving terminal data from the terminals responsive to changes in schedule or capabilities of the terminals.

5. The system of claim 1, further comprising receiving the data from the vehicle over a wide-area network responsive to occurrence of one or more trigger conditions.

6. The system of claim 5, wherein the trigger conditions include one or more of the vehicle traversing a predefined distance, a predefined amount of time of operation of the vehicle, a predefined amount of time having elapsed, or a predefined number of key-on cycles of the vehicle.

7. The system of claim 5, wherein the trigger conditions include a sensor of the vehicle indicating a spill or odor within the vehicle.

8. The system of claim 1, wherein the scheduling server is further programmed to receive an indication from the identified terminal that the service is complete and a confirmation from the vehicle that the service is complete.

9. The system of claim 1, wherein the scheduling server is further programmed to send a command to the vehicle to unlock the vehicle responsive to arrival of the vehicle at the identified terminal.

10. The system of claim 1, wherein the scheduling server is further programmed to send, to the identified terminal, a credential to unlock the vehicle responsive to arrival of the vehicle at the identified terminal.

11. A method comprising:
    identifying, from data received over a wide-area network from an autonomous vehicle, a service for the vehicle and a terminal for performing the service, the terminal being selected from a plurality of terminals as a closest parking facility of the plurality of terminals having a slot for servicing vehicles available for performing the service, the terminals including parking garages, the slot for servicing vehicles being defined according to the services for which the terminals have available capacity reallocated to be used in servicing vehicles, wherein hours of the available capacity differ from hours of operation of the terminals for handling non-autonomous vehicle traffic;
    directing the vehicle to the terminal;
    providing access to the vehicle responsive to arrival of the vehicle at the terminal; and
    allowing the vehicle to be used for autonomous driving responsive to confirmation that the service is completed.

12. The method of claim 11, further comprising:
    identifying, from the data, a second service for the vehicle and a second terminal for performing the service;
    directing the vehicle to the second terminal;
    providing access to the vehicle responsive to arrival of the vehicle at the second terminal; and
    directing the vehicle to the terminal responsive to confirmation from the vehicle that the second service has been completed.

13. The method of claim 11, further comprising:
    receiving a request to add a new terminal as available for performing service to vehicles;

identify times and capabilities for the new terminal to add; and register the new terminal as available for performing the service to vehicles according to the times and capabilities.

14. The method of claim 11, further comprising identifying the terminal from a plurality of terminals as being a closest parking facility from the plurality of terminals having a slot for servicing vehicles available for performing the service.

15. The method of claim 11, further comprising:

decrementing a count of available slots for servicing vehicles for the terminal responsive to directing the vehicle to the terminal; and incrementing the count of available slots for servicing vehicles for the terminal responsive to the confirmation that the service is completed being received from the vehicle.

16. The method of claim 11, further comprising sending a command to the vehicle to unlock the vehicle responsive to arrival of the vehicle at the terminal.

17. The method of claim 11, further comprising sending, to the terminal, a credential to unlock the vehicle responsive to arrival of the vehicle at the terminal.

18. A non-transitory computer-readable medium comprising instructions that, when executed by a scheduling server, cause the scheduling server to:

identify, from data received over a wide-area network from an autonomous vehicle, a first service for the vehicle to be performed at a first terminal and a second service for the vehicle to be performed at a second terminal, the first terminal being selected from a plurality of terminals as a closest parking facility of the plurality of terminals to the vehicle having a slot for servicing vehicles available for performing the first service, the second terminal being selected from the plurality of terminals as a closest parking facility of the plurality of terminals to the first terminal having a slot for servicing vehicles available for performing the second service, the terminals including parking garages, the slots for servicing vehicles being defined according to the services for which the terminals have available capacity that was reallocated to be used in servicing vehicles, wherein hours of the available capacity differ from hours of operation of the terminals for handling non-autonomous vehicle traffic;

direct the vehicle to the first terminal;

provide access to the vehicle to the first terminal to perform the first service responsive to arrival of the vehicle at the first terminal;

direct the vehicle to the second terminal responsive to confirmation that the first service is completed;

provide access to the vehicle to the second terminal to perform the second service responsive to arrival of the vehicle at the second terminal; and allow the vehicle to be used for autonomous driving responsive to confirmation that the second service is completed.

19. The medium of claim 18, further comprising instructions that, when executed by a scheduling server, cause the scheduling server to:

decrement a count of available slots for services vehicles for the first terminal responsive to arrival of the vehicle at the first terminal;

increment the count of available slots for servicing vehicles for the first terminal responsive to the confirmation from the vehicle that the service is completed; and mark the first terminal as unavailable for servicing vehicles responsive to the count being zero.

* * * * *